United States Patent [19]

Hauffe

[11] 4,409,708

[45] Oct. 18, 1983

[54] PIPE CLAMP WITH IMPROVED RETAINING LUGS

[75] Inventor: William L. Hauffe, Warrensburg, Ill.

[73] Assignee: Mueller Co., Decatur, Ill.

[21] Appl. No.: 273,184

[22] Filed: Jun. 12, 1981

[51] Int. Cl.³ .................. B65D 63/02; F16L 55/16
[52] U.S. Cl. ................................ 24/279; 285/373; 138/99
[58] Field of Search .............. 24/279, 284, 285; 285/373; 138/99

[56] References Cited

U.S. PATENT DOCUMENTS

| | | | |
|---|---|---|---|
| 1,907,889 | 5/1933 | Stauffer | 24/279 |
| 2,853,762 | 9/1958 | Smith | 24/279 |
| 2,998,629 | 9/1961 | Smith | 24/279 |
| 3,088,185 | 5/1963 | Smith | 24/279 |
| 3,089,212 | 5/1963 | Graham et al. | 24/279 |
| 3,175,267 | 3/1965 | Graham | 24/279 |
| 3,183,938 | 5/1965 | Smith et al. | 24/279 |
| 3,195,205 | 7/1965 | Morriss, Jr. et al. | 24/279 |
| 3,195,206 | 7/1965 | Morriss, Jr. | 24/279 |
| 3,254,387 | 6/1966 | Smith | 24/279 |
| 3,584,352 | 6/1971 | Turner | 24/279 |
| 3,584,353 | 6/1971 | Smith | 24/279 |
| 3,680,180 | 8/1972 | Gould et al. | 24/279 |

*Primary Examiner*—John J. Wilson
*Attorney, Agent, or Firm*—Cushman, Darby & Cushman

[57] ABSTRACT

A pipe clamp for use in encircling a pipe or main as either a pipe repair clamp or a service side outlet clamp. The pipe clamp comprises a flexible metal band made of sheet metal or the like having a gasket liner which seals with a section of the exterior of the pipe, the band being split and made of at least one section and having at least a pair of lugs attached to each of its opposed end portions. Bolts are used to draw the lugs together and cause the band to tightly encircle the pipe. An improved retention of the band ends in the lugs is provided, the lugs being of the type having ductile jaws initially cast in an open position, one of the jaws having a projection thereon and the other jaw having a recess for cooperating with the projection when the jaws are closed on the band end. The cooperating projection and recess are dimensioned to provide a space between the same when the jaws are closed, the space having a first portion of less thickness than the metal band whereby the band is reduced in thickness when the jaws are closed and another portion with a thickness at least as great as the thickness of the band to provide for ease in closing the jaws.

24 Claims, 13 Drawing Figures

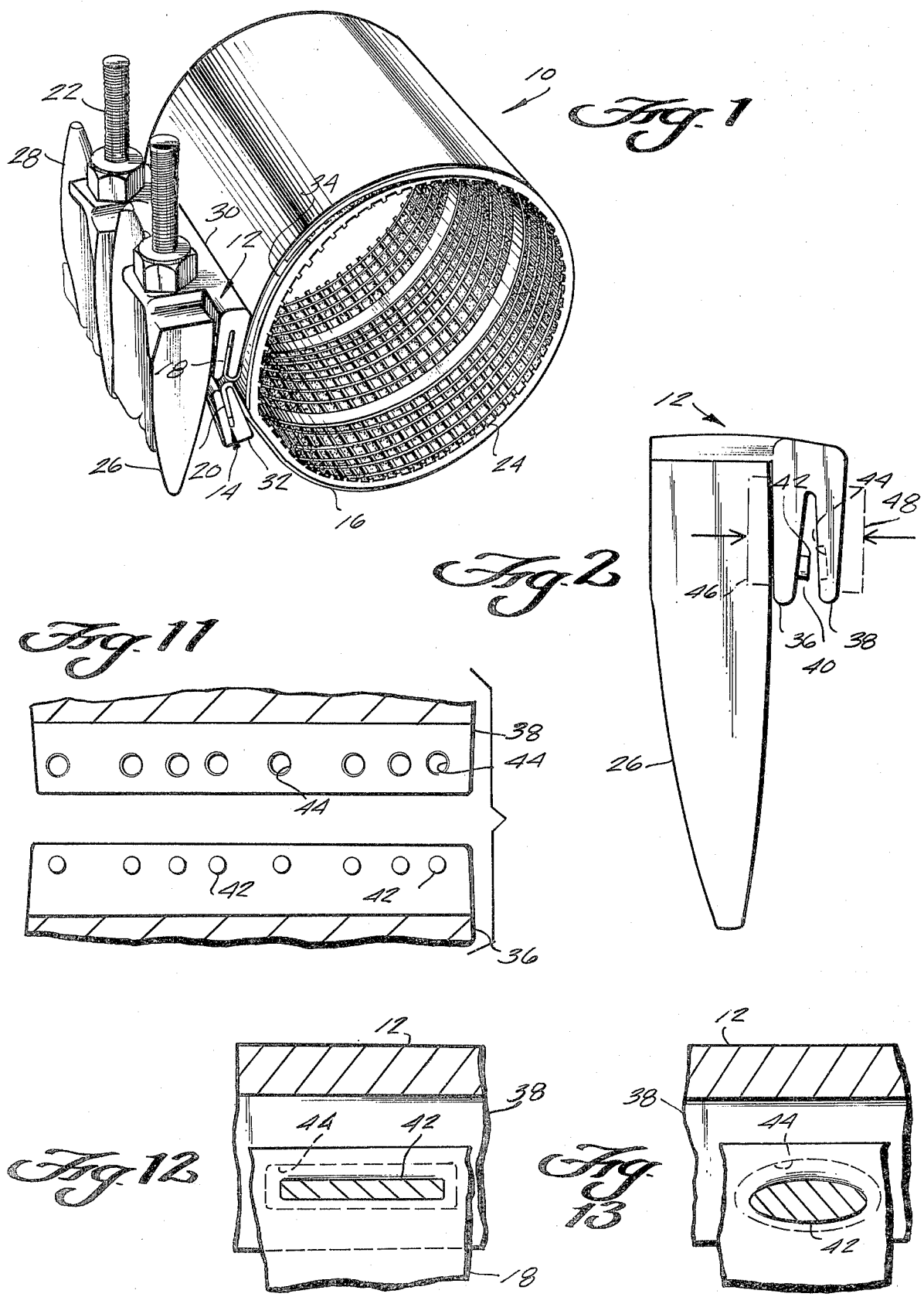

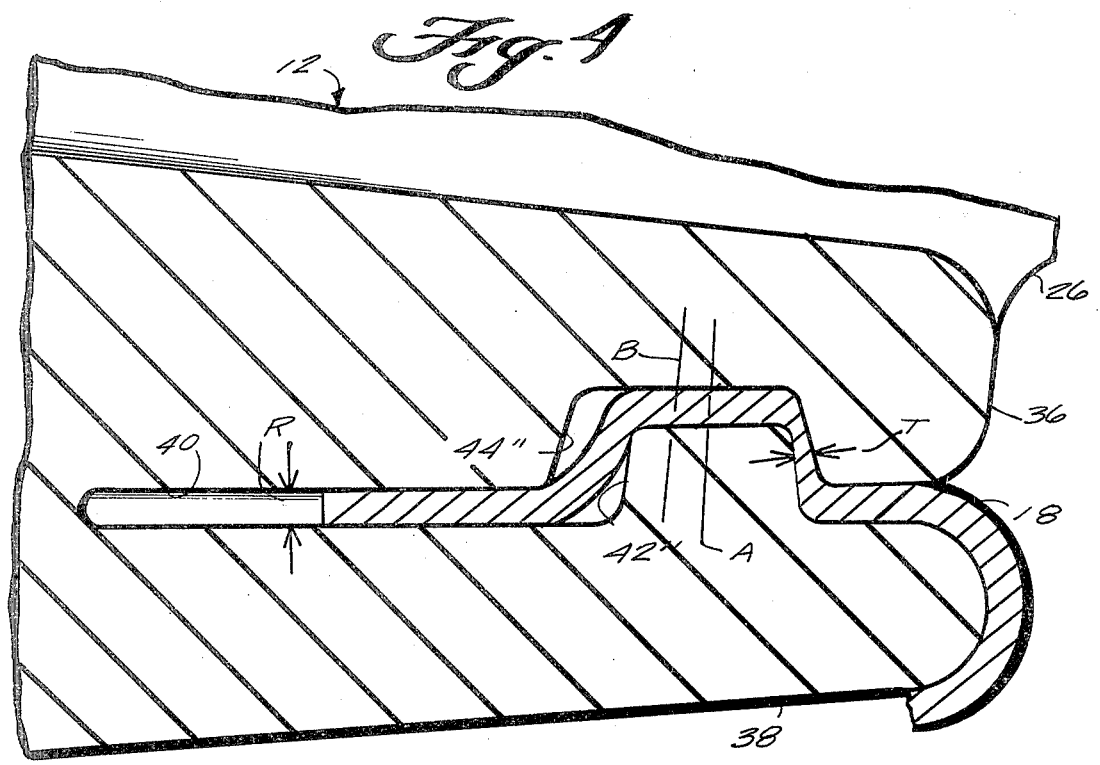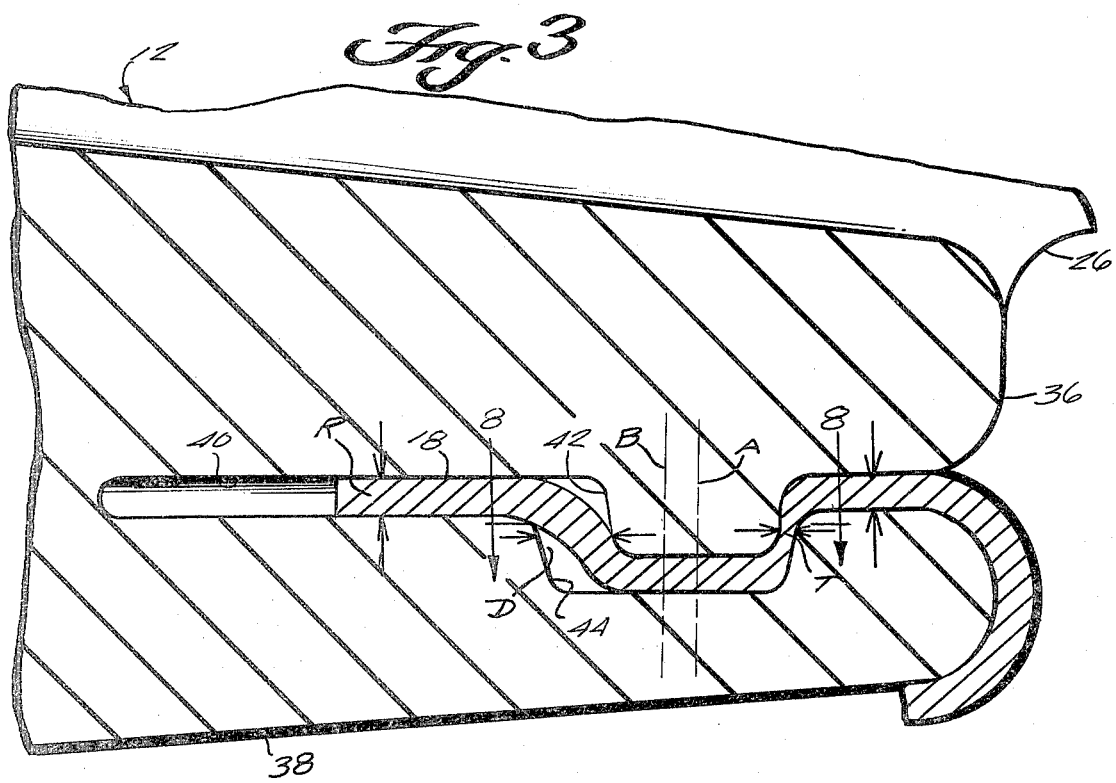

PIPE CLAMP WITH IMPROVED RETAINING LUGS

FIELD OF INVENTION

The present invention relates to pipe clamps of the type having split flexible band means with at least one pair of spaced end portions, a pair of rigid lugs attached to the end portions and arranged to be drawn together by bolt means to cause the band means to tightly encircle a pipe or main. More particularly, the present invention relates to an improvement in the lugs relative to the means on the lugs for retaining the band ends therein whereby increased torque can be applied to the bolt means without the band means pulling out or failing.

BACKGROUND OF THE INVENTION

Pipe clamps of the type utilizing split flexible bands for encircling the pipe have been provided with lugs attached to the spaced band ends, the lugs being drawn together by bolts to cause the band and its gasket to tighten about the pipe. In the prior arrangements of the lugs, various means have been provided for attaching the band ends thereto. In some of the prior arrangements, the means for attaching the band ends to the lugs have been quite satisfactory but, on the other hand, quite complicated to manufacture and assemble as they required locking members installed after insertion of the band ends into the lugs and, thus, quite costly to produce.

More recently, efforts have been made to provide the lugs of such pipe clamps with ductile jaws, the jaws being cast in an open position and then the band ends inserted therein. Once the band ends were inserted into the jaws, the jaws were closed on the band ends and the particular configuration of the jaws and/or of the band ends were utilized to restrain the band ends from being pulled out when the pipe clamp was applied to a pipe. While such arrangements have been satisfactory in the past where it was only necessary to apply low torque to the bolt means for tightening the clamp about the pipe, higher torques are now required, especially on large diameter pipes or where the smaller diameter pipes are utilized for transferring fluids under higher pressures necessitating higher sealing pressures by the gasket of the flexible band means.

PRIOR ART

Typical prior art arrangements of pipe clamps utilizing a split flexible metal band, lugs attached to the end portions of the band, and bolt means for drawing the lugs and the band ends together to cause the band and its gasket to tighten about a pipe may be found in the following United States patents:

| | | |
|---|---|---|
| 1,907,889 | Stauffer | May 9, 1933 |
| 2,853,762 | Smith | Sept. 30, 1958 |
| 2,998,629 | Smith | Sept. 5, 1961 |
| 3,088,185 | Smith | May 7, 1963 |
| 3,089,212 | Graham et al | May 14, 1963 |
| 3,175,267 | Graham | March 30, 1965 |
| 3,183,938 | Smith et al | May 18, 1965 |
| 3,195,205 | Morriss, Jr. et al | July 20, 1965 |
| 3,195,206 | Morriss, Jr. | July 20, 1965 |
| 3,254,387 | Smith | June 7, 1966 |
| 3,680,180 | Gould et al | Aug. 1, 1972 |

The above listed patents disclose pipe clamps having broadly two types of retaining means for retaining the band ends of a split flexible band in lugs. The first type of retaining means requires a rigid lug having a particular configuration, such as a slot, for receiving the band end, and also having a separate element or member cooperating with the lug and with the band end to lock the band end to the lug.

A typical disclosure of the first type of pipe clamp referred to above is shown in the Gould et al U.S. Pat. No. 3,680,180 wherein a slot is provided in the lug, the slot having a cored bore therein at its inner end and the band end portion also having a looped end. The band end portion must be slid axially into the slot with the looped end into the cored bore. A rod is subsequently forced into the looped end of the band so as to lock the band end to the lug. Another patent of the type requiring a further locking member is the Smith U.S. Pat. No. 2,998,629 which utilizes wedges of various configurations. The arrangements disclosed in patents of these types, while performing satisfactorily, are quite difficult to manufacture and assemble and, thus, very expensive.

The second type of pipe clamp referred to above, namely, the type provided with lugs having ductile jaws originally cast in an open position is typically shown in the Graham et al U.S. Pat. No. 3,089,212. In this patent one jaw is provided with projections which are arranged to be received in recesses provided in the other jaw, the projections being centered in the recesses when the jaws are closed. In one instance, the projections deform or dimple the band ends, and in another instance the projections extend through holes provided in the band ends. The space between the projection and the recess when the band end is closed is uniform and, thus, in the situation where the band end is dimpled uniformly by the projection into the recess, there is no reduction of thickness in a portion of the band ends being dimpled and it requires less torque to cause failure as the dimple will merely move through the sheet of band material.

In another effort to retain the band ends in a lug having ductile jaws, there is disclosed in the Morriss, Jr. et al U.S. Pat. No. 3,195,206 ductile jaws having a plurality of sharp edged particles randomly disposed thereon for digging into the band ends. The grit particles are difficult to embed in the jaws, and a separate process is required in the manufacture of the jaws to first apply the particles to a core for forming the jaws and then transferring the particles from the core to the jaws. Since the particles of grit are randomly applied, the holding power of the lugs for a particular size of clamp cannot be uniformly predicted.

BRIEF DESCRIPTION OF THE PRESENT INVENTION

The present invention relates to a pipe clamp of the type including a flexible metal band means for encircling the pipe, the band means having a pair of spaced ends to which a pair of metal lugs are attached. The lugs are drawn together by bolt means to tighten the band about the pipe, and the lugs have an improved retaining means for the band ends. The retaining means for the lugs includes a pair of ductile jaws cast in the open position and having a mouth for receiving the ends of the band means therebetween and arranged to be closed after insertion. One of the jaws of the lugs has at least on projection thereon and the other jaw has at least one recess thereon for receiving the projection. The projection and the recess are dimensioned to provide a space therebetween when the jaws are closed for receiving a portion of the band means therebetween. The projection is eccentrically positioned with respect to the recess to provide a portion of the space between the projection and the recess of less thickness than the band means whereby the band means is reduced in thickness when the jaw members are closed. The remainder of the portion of the space between the projection and the recess has a thickness at least equal to the thickness of the band means to provide ease in closing of the jaws.

In a preferred embodiment of the present invention, the at least one projection is provided on the jaw positioned away from the pipe when the clamp encircles the same, both the at least one projection and the at least one recess being circular in cross-section, and the at least one projection being eccentrically positioned with respect to the recess so that the thickness of the space between the projection and the recess which is less than the thickness of the band means is toward the open or outer end of the mouth of said jaws when the jaws are in a closed position.

Ancillary to the above, the present invention provides an elongated lug in which there are a pair of ductile jaws and in which the respective jaws have a plurality of cooperating projections and recesses arranged on axes parallel to the longitudinal axis of the lug. The projections and the cooperating recesses are dimensioned to provide spaces between the same when the jaws are closed, the spaces each having a first portion of less thickness than the thickness of the band means whereby when the jaws are closed on the band means, the same is reduced in thickness in this area. The spaces each have a second portion with a thickness at least as great as the thickness of the band means to provide ease in closing of the jaws on the band means.

The present invention also contemplates utilizing the lugs with ductile jaws cast in an open position for receiving the end portions of a flexible band means, the jaws respectively having cooperating projections and recesses having similar cross-sectional configurations and dimensioned as described above. The cross-sectional configurations may be circular, rectangular, elliptical or the like.

BRIEF DESCRIPTION OF THE DRAWINGS

FIG. 1 is a perspective view of a pipe clamp utilizing the improved lugs of the present invention for retaining the end portions of a split ductile band means;

FIG. 2 is an enlarged side elevation of one of the lugs of the present invention;

FIG. 3 is an enlarged fragmentary sectional view taken longitudinally through the jaws of the lug but showing the jaws of the lug in the closed position clamping an end portion of the band means;

FIG. 4 is a view similar to FIG. 3 but showing a modified version of the present invention wherein the projection is provided on the inner jaw and the recess is provided on the outer jaw of the lug;

FIG. 11 is a schematic sectional view of both jaws of the lug of the present invention and illustrating the relative longitudinal positioning of the projections and the cooperating recesses;

FIG. 12 is an enlarged cross-sectional view illustrating a modified cross-section for the projection and recesses of the lugs; and FIG. 13 is a view similar to FIG. 12 but showing still another modified cross-section of the projections and recesses for the lug of the present invention.

DETAILED DESCRIPTION OF THE DRAWINGS

Figure 6:
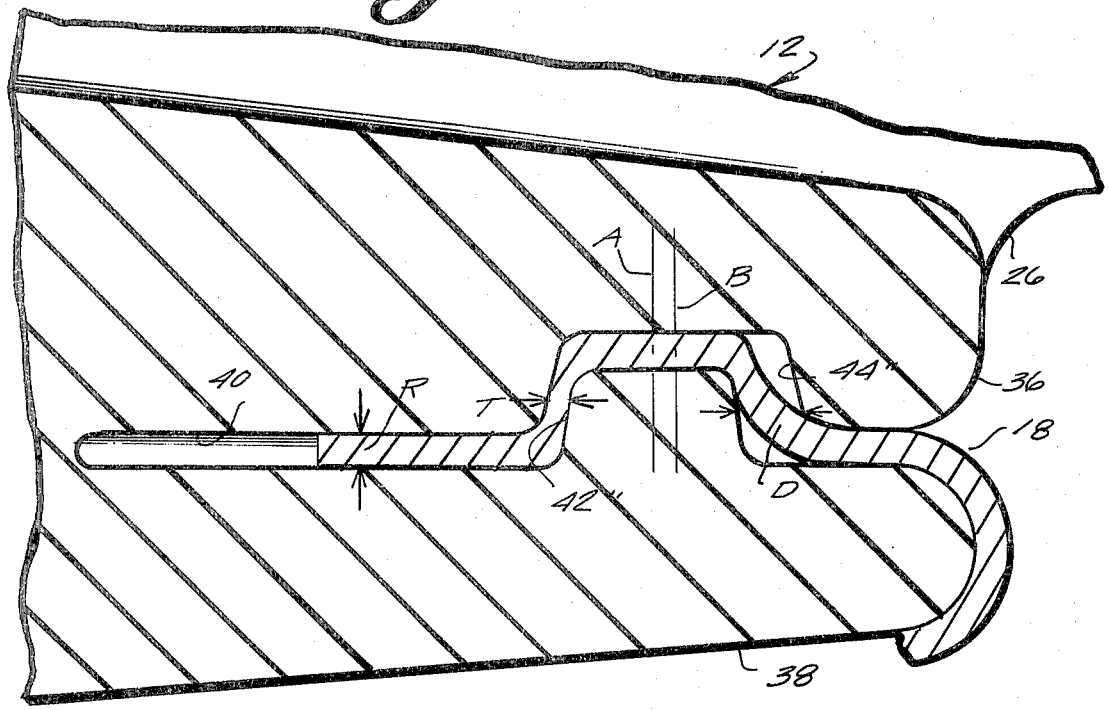
FIG. 6 is a still further cross-section view of another modification similar to FIG. 5 but with the projection on the lower or inner jaw and the recess on the upper or outer jaw of the lug.

Referring now to the drawings wherein like character or reference numerals represent like or similar parts, there is shown in FIG. 1 a perspective view of a typical low-profile pipe clamp generally designated at 10 utilizing the lugs 12 and 14, respectively, of the present invention. The pipe clamp 10 encircles a pipe or main (not shown) and may be of the type for repairing holes or cracks in the pipe or it may be of the type to provide a service side outlet to which a service pipe is connected such as disclosed in U.S. Pat. No. 3,467,943, issued Sept. 16, 1969, to Phillip N. Adams, and assigned to the same assignee, Meuller Co., Decatur, Ill.

The low-profile pipe clamp 10 includes a split flexible metal band means 16, the band means 16 being provided with bent-back spaced end portions 18 and 20 arranged to be fixedly secured to the improved pair of lugs 12 and 14 of the present invention. Tightening means comprising the bolt means 22 extend between the lugs 12 and 14 and are arranged to draw the lugs toward one another so as to cause the band means 16 to be tightly drawn about the pipe and thereby cause a gasket member 24 carried on the interior of the band means 16 to tightly press against the pipe wall to provide a fluid-tight seal therewith.

The lugs 12 and 14 may be provided with fingers 26 and 28, respectively, for controlling the bolt bending strain on the bolt means 22. In this respect, the fingers 26 and 28, as well as the body 30 and 32 of the lugs 12 and 14 may have an external configuration similar to that disclosed in the U.S. Pat. No. 3,680,180, issued Aug. 1, 1972, to Wallace E. Gould and Peter N. Cassimatis, and assigned to the same assignee, Mueller Co., Decatur, Ill. While the lugs 12 and 14 of the present invention have been shown as provided with fingers of the type described in the aforementioned patent, it will be appreciated that the pipe clamp may have other configurations of cooperating fingers or it may be of the type in which no fingers are utilized.

The pipe clamp 10 illustrated in FIG. 1 utilizes the split flexible band means 16 having two opposed end portions 18 and 20 with lugs 12 and 14 attached thereto for drawing the band means tightly about the pipe. However, for larger diameter pipes the band means may be made up of a plurality of sections with the opposed end portions between adjacent sections being provided with the lugs 12 and 14 of the present invention capable of drawing the entire band means tightly about the pipe. Such multi-section pipe clamps are well known in the prior art, and thus it is not believed necessary to further describe or disclose a multi-section pipe clamp in more detail in this specification as it will be understood by those skilled in the art, the improved lugs in the appended claims are intended to cover an arrangement utilizing either a single section or a multi-section pipe clamp.

The band means 16 is made from a suitable rust-resistant noncorrosive ductile sheet metal material such as bronze or stainless steel and is generally curved to provide a semi-cylindrical portion having a radius of curvature which permits it to be flexed about a pipe of a size falling within a particular range of sizes. The gasket member 24, which is made of an elastomeric material such as rubber or neoprene, is bonded by a suitable adhesive or bonding material to the internal surface of the split flexible band means 12, and it may have one end which projects beyond the area where the band means 12 is split so that its joint line between two adjacent ends does not occur in this area. A gap bridge or spanner member 34 spans the joint or space between the opposed lugs 12 and 14 and the end portions 18 and 20 of the band means 16, the gap bridge 34 being a metal shim extending longitudinally of the clamp and being arcuate in radial section and of a selected width. Gap bridges, such as the gap bridge 34, are usually provided on split clamps of this type to prevent the gasket member 24 from being extruded between the spaced end portions 18 and 20 as the lugs are drawn together and also to prevent the lugs from digging into the gasket member.

Figure 8:
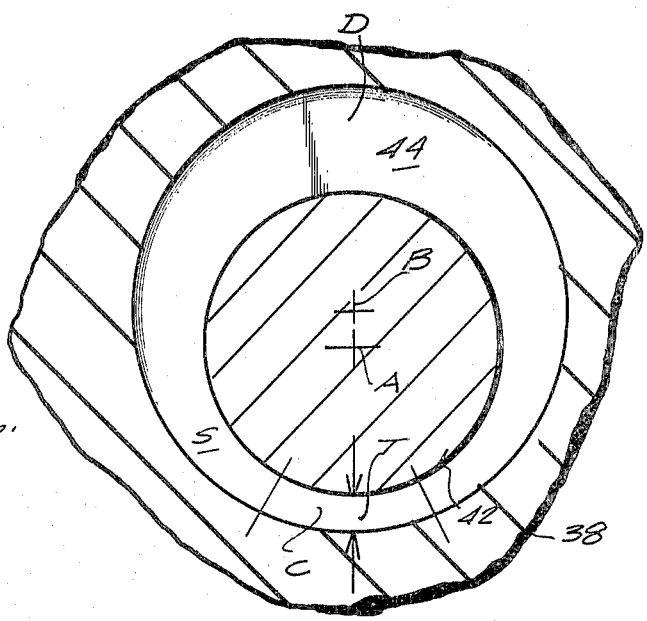
FIG. 8 is an enlarged fragmentary horizontal cross-sectional view taken substantially on the line 8—8 of the preferred form of the invention shown in FIG. 3.

Referring now to FIGS. 2, 3 and 8 of the drawings, there is disclosed in detail one of the lugs 12 or 14 of the present invention. The lugs 12 and 14 which are connected to the bent-back end portions 18 and 20 of the split flexible metal band means 12 are identical in all respects relative to the features of the present invention, namely, the means for attaching the end portions of the band means to the lugs. The lugs 12 and 14 are cast from a ductile metal, such as malleable iron, stainless steel, bronze, aluminum, or the like. It is essentially that the metal used in casting the lugs be capable of bending or coining rather than being brittle like cast iron. Each of the lugs 12 and 14 is cast with an upper jaw 36 and a lower jaw 38 in an open position as shown in FIG. 2, the jaws defining a mouth 40 therebetween. In the environment shown in FIGS. 2, 3 and 8, the upper jaw 36 is cast with a plurality of projections 42 thereon arranged in a line parallel to the longitudinal axis of the lug, whereas the lower jaw 38 is cast with a plurality of cooperating recesses 44 therein likewise arranged in a row on a line parallel to the longitudinal axis of the lug. In the embodiment under consideration, each of the projections 42 and recesses 44 are circular in cross-section.

Figure 7:
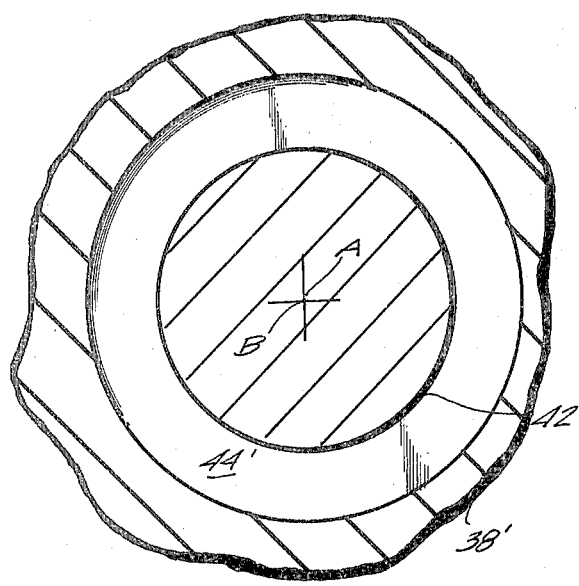
FIG. 7 is a fragmentary horizontal cross-sectional view through a lug of the prior art illustrating the dimensional relationship between the projection on one jaw and the recess in the other jaw of the lug.

In the prior art, lugs have been cast with jaws in the open position, one of the jaws having projections and the other jaw having recesses with the projections arranged to mate with the recesses when the jaws are closed onto the band end portion. Such prior art arrangement, as shown in FIG. 7, provided for a perfect mating of the projections and recesses, and when the jaws were closed the projections 42' were equally spaced from the walls of the recesses 44' around the same, the spacing being substantially equal in thickness to the thickness of the material and the band means. In other words the projections had axes A which were coaxial with the axes B of the respective recesses, thus providing a uniform space between mating elements.

In the present invention as shown in FIGS. 2, 3 and 8, the axis A of the projection 42 is arranged to be offset with respect to the axis B of the cooperating recess 44 so that while the space S was provided completely around the projection 42 between the walls of the recess 44, a portion of the space S identified in FIG. 8 as C had a thickness T less than the thickness R of the band means. The remaining portion of the space D between the projection 42 and the walls of the recess 44 had a thickness at least as great as the thickness R of the metal band.

When the band end portion is placed between the open jaws 36 and 38 in FIG. 2, the die members 46 and 48 of a press are moved toward one another to cause the lower ductile jaw 38 to be bent to the position shown in FIG. 3, thus clamping the end portion 18 or 20 of the band means 16 therebetween. However, as will be noted in FIG. 8, the offset axes A and B of the respective projections and recesses 42 and 44 which provides for a portion C of the space S to be of less thickness than the metal band results in the metal band being reduced in thickness in this localized area. By such an arrangement, whereby the band end portions are locally thinned, the resistance to pull-out of the end portions of the band means is increased materially, resulting in being able to apply more torque to the bolt means of the clamp and, thus a tighter seal of the gasket 24 to the pipe. In the arrangement shown in FIGS. 2, 3 and 8, it will be noted that the axis A of the projection 42 is offset in a direction toward the outer end of the mouth 40 of the jaws, thus resulting in the locally thinned area being toward the outer end of the jaws. By having the localized space D of a thickness at least as great as the thickness of the band material of band means 16, the jaws are easier to close by the die members.

Referring now to FIG. 4, there is disclosed a modification of the arrangement shown in FIG. 3 wherein the upper jaw 36 is provided with the recess 44'', and the lower jaw 38 is provided with the projection 42''. Again, the respective axes A and B are offset identically to the described with respect to FIG. 3 resulting in a locally thinned portion T of the bent-back end portion 18 or 20 of the band means 16 being toward the front of the mouth 40. The arrangement shown in FIG. 4, while not as preferred as that shown in FIG. 3, will also provide for increased holding power of the end portions of the split band means.

Figure 5:
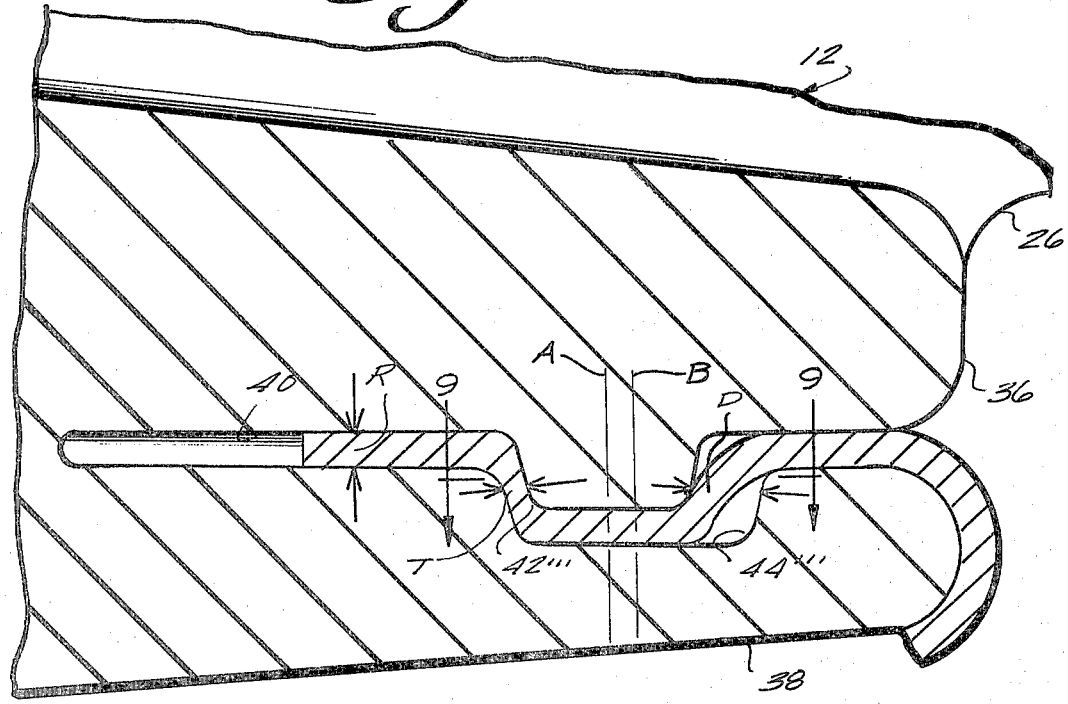
FIG. 5 is a further modified cross-sectional view similar to FIG. 3 but showing a further version with the projection on the upper jaw offset relative to the recess in a direction toward the closed end of the mouth between the jaws of the lug.
Figure 9:
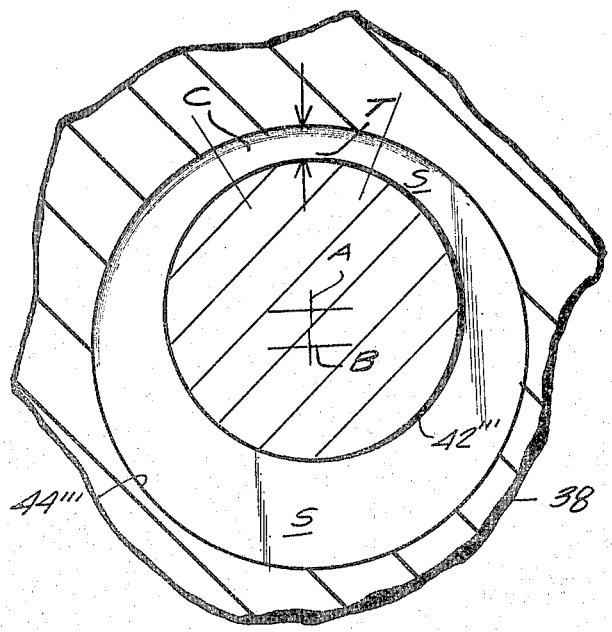
FIG. 9 is an enlarged fragmentary cross-sectional view taken substantially on the line 9—9 of FIG. 5.

Referring next to FIGS. 5 and 9, there is disclosed a still further modification of the present invention wherein the projections on one lug are dimensioned with respect to the recesses on the other lug so that there is a reduced area in a portion of the space defined between the projections and the recesses when the jaws are closed. In this modification, the upper jaw 36 is provided with projections 42''' which have their axes A offset relative to the axis B of the recesses 44''', but in this instance the offsetting is toward the inner end of the mouth 40. The reduced portion T of the space between a projection and a recess is located toward the inner end of the mouth 40 and thus provides a thinning of the band means 16 in this area. FIG. 6 discloses a similar arrangement to FIG. 5, but with the projection 42''' provided on the lower jaw 38 with the cooperating recess 44''' provided on the upper jaw 36.

Figure 10:
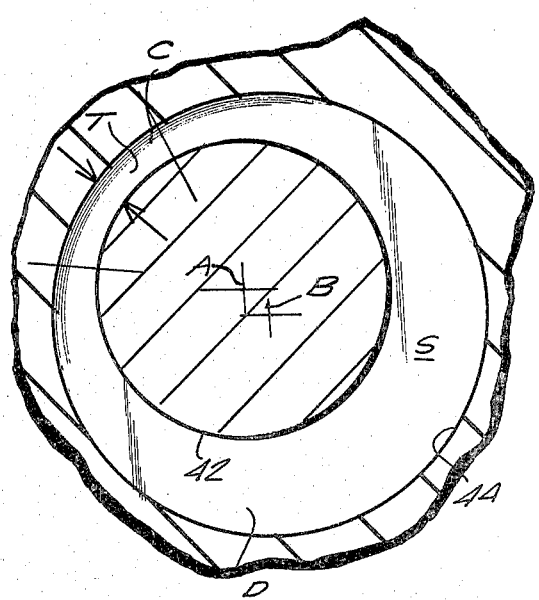
FIG. 10 is an enlarged horizontal cross-sectional view similar to FIGS. 8 and 9 but illustrating a further modification of the present invention wherein the axis of the projection is radially offset toward one side of the lug with respect to the axis of the recess.

FIG. 10 is a further showing of the concept of offsetting the axis A of the projection 42 relative to the axis B of the recess 44 in the respective jaws of a lug of the present invention. In this arrangement, the axis A of the projection is radially offset with respect to the axis B of the recess in a direction toward one side or the other of the mouth of the jaws rather than toward the front or rear of the mouth.

In the environment shown in FIG. 10, the thinning of the band end will occur at T in the portion C of the space S with the remaining portion D having a thickness at least as great as the thickness of the material from which the band means is fabricated.

FIGS. 12 and 13 disclose further modifications employing the same principle as heretofore described, these modifications differing only in that in one instance (FIG. 12) both the projection 42 and the recess 44 are rectangular in cross-sectional shape and have their major axes parallel to one another but spaced from one another with both axes being parallel to the longitudinal axis of the lug 12 or 14 as the case may be. In FIG. 13 the cross-sectional shape of the projection 42 and the recess 44 is elliptical and, again, the major axes of the projection 42 and recess 44 are parallel but spaced from one another with both being parallel to the longitudinal axis of the lug 12 or 14 as the case may be. By the arrangement disclosed in either FIGS. 12 or 13, there is provided a localized area of the space between the projection and the recess which is of less thickness than the thickness of the band means material, thus resulting in thinning of the band means in this area.

A satisfactory clamp utilizing lugs of the present invention has been manufactured and tested. In this respect, the clamp had a 6 inch longitudinal length and the die members 46 and 48 of a 200 ton press were utilized to close the jaws 36 and 38 of the lug onto the band end portions. It took between 40 and 50 tons to close the jaws 36 and 38 upon the end portions 18 or 20, and thus to form the metal of the band ends between the projections 42 and recesses 44 with a thinning of the metal in the area described. This clamp which was of a size to fit on a 4 inch outside diameter pipe was tested on a 4.02 inch mandrel, and torque was applied to the bolt means in the amount of 70 ft.-lbs. The band ends of the band means 16 did not pull out of the jaws of the lugs. A similar clamp, but of the prior art design as shown in FIG. 7 wherein a uniform space was provided between each projection and its recess mating when the jaws were closed upon the band ends of a split metal band, was also tested on a 4.02 inch mandrel, and it was found that the band ends pulled out of the jaws of the lugs at 40 ft.-lbs. The failure mode for the prior art clamp resulting in pull-out was because the material of the band ends was merely deformed or dimpled uniformly, and during the application of high torque, the dimple or deformation merely moved through the sheet of band material. In the clamp of the present invention, higher torque resulted because it was not only necessary for the deformed or dimpled area to move through the sheet of the band means but because of the locally reduced area in cross-section, before there could be movement of this deformed or dimpled area, there had to be a further extrusion through the gap of reduced thickness. In both cases, there was no failure in the jaws of the lugs moving apart as it would require tons of load to spring the jaws back to the open position, and, as will be appreciated, the material from which the band is made is not strong enough to transfer a load to open the jaws.

The terminology used throughout this specification is for the purpose of description and not limitation as the scope of the invention is defined in the claims.

What is claimed is:

1. A pipe clamp including a flexible metal band means for encircling a pipe, the band means having at least a pair of spaced ends arranged to be drawn toward one another, a pair of metal lugs, each of said lugs having means for retaining one of the respective ends of said band means, and bolt means for drawing said lugs together to tighten said band means about the pipe, the improvement in said retaining means comprising:

each of said lugs having a pair of ductile jaws cast in an open position and having a mouth for receiving one of said ends of the band means therebetween and arranged to be closed after insertion of the one end of said band means, one jaw of said lug having at least one projection thereon, the other jaw of said lug having at least one recess therewithin for receiving the projection with the end of the band means therebetween when the jaws of said lug are closed, said projection and said recess being dimensioned to provide a space therebetween when said jaws are closed and said projection being eccentrically positioned with respect to said recess to provide a portion of the space between said projection and said recess of less thickness than a thickness of said band means whereby said band means is reduced in thickness in said portion when said jaw members are closed and a remainder portion of the space between said projection and said recess of at least a thickness equal to the thickness of said band means.

2. A pipe clamp as claimed in claim 1 in which said portion of the space between said projection and said recess of less thickness is positioned toward the open end of said mouth when said jaws are in the closed position.

3. A pipe clamp as claimed in claim 1 wherein said portion of the space between said projection and said recess of less thickness is positioned toward a rear of said mouth.

4. A pipe clamp as claimed in claim 1 in which said portion of the space between said projection and said recess of less thickness is positioned toward one side of said lug.

5. A pipe clamp as claimed in any of claims 1 to 4 in which said projection and said recess are both circular in cross-section.

6. A pipe clamp as claimed in claims 1, 2 or 3 in which said projection and said recess are each rectangular in cross-section.

7. A pipe clamp as claimed in claims 1, 2 or 3 in which said projection and said recess are both elliptical in cross-section.

8. A pipe clamp as claimed in any of claims 1 to 4 in which the one jaw of said pair of jaws positioned away from said pipe when the clamp encircles the same is provided with the projection and the other of said jaws is provided with the recess.

9. A pipe clamp as claimed in any of claims 1 to 4 in which the one jaw of said pair of jaws positioned away from the pipe when the pipe clamp is encircling the same is provided with the recess and the other of said jaws is provided with the projection.

10. A pipe clamp for encircling a pipe, said pipe clamp comprising:
   a split flexible metal band means including at least one pair of circumferentially spaced bent back end portions arranged to be drawn towards each other;
   at least one pair of elongated lugs respectively attached to said at least one pair of end portions and having longitudinal axes extending parallel to the pipe when the clamp encircles the same;
   bolt means for moving said lugs toward one another to tighten said band means about said pipe; and
   means on each of said lugs for retaining the end portions of said band means, said retaining means on each elongated lug including a pair of ductile jaws extending longitudinally of the lug and cast in an open position with a mouth to receive the end portion of the band means, one of said jaws having a plurality of spaced projections extending longitudinally of the same and each of said projections having a circular cross-sectional configuration, the other of said jaws having a plurality of spaced recesses extending longitudinally of the same and each of said recesses having a circular cross-sectional configuration, said recesses cooperating with said projections to clamp the end portion of said band means therebetween when said jaws are closed, said projections having axes radially offset with axes of cooperating recesses when said jaws are closed whereby cooperating projections and recesses are dimensioned to provide a space between the same when the jaws are closed, said space having a first portion of less thickness than the thickness of said band means whereby said band means is reduced in thickness when the jaws are closed and said space having a second portion of thickness at least as great as said band thickness to provide ease in closing said jaws.

11. A pipe clamp as claimed in claim 10 in which the axes of said projections are radially offset in a direction toward an outer end of the mouth of said jaws.

12. A pipe clamp as claimed in claim 10 in which the axes of said projections are radially offset with respect to the axes of the cooperating recesses in a direction toward an inner end of the mouth of said jaws.

13. A pipe clamp as claimed in any one of claims 10, 11 or 12 in which said projections are on the one of said jaws positioned outwardly of the other of said jaws when the pipe clamp is encircling a pipe.

14. A pipe clamp as claimed in any of claims 10, 11 or 12 in which said projections are on the one of said jaws positioned upwardly of the outer jaw and closest to said pipe when the pipe clamp encircles the same.

15. A pipe clamp for encircling a pipe, said pipe clamp comprising:
   a split flexible metal band means including at least one pair of circumferentially spaced bent back end portions arranged to be drawn towards each other;
   at least one pair of elongated lugs respectively attached to said at least one pair of end portions and having longitudinal axes extending parallel to the pipe when the clamp encircles the same;
   bolt means for moving said lugs toward one another to tighten said band means about said pipe; and
   means on each of said lugs for retaining the end portions of said band means, said retaining means on each elongated lug including a pair of ductile jaws extending longitudinally of the lug and cast in an open position with a mouth to receive the end portion of the band means, one of said jaws having a plurality of spaced projections extending longitudinally of the same and each of said projections having a rectangular cross-sectional configuration with a major axis extending parallel to the longitudinal axes of the lug, the other of said jaws having a plurality of spaced recesses extending longitudinally of the same and each of said recesses having a rectangular cross-sectional configuration with a major axis extending parallel to the longitudinal axis of the lug, said recesses cooperating with said projections to clamp the end portion of said band means therebetween when said jaws are closed, each of said projections having the major axis thereof offset with respect to the major axis of the cooperating recess of said recesses when said jaws are closed whereby cooperating projections and recesses are dimensioned to provide a space between the same when the jaws are closed, said space having a first portion of less thickness than the thickness of said band means whereby said band means is reduced in thickness when the jaws are closed and said space having a second portion of thickness at least as great as said band thickness to provide ease in closing said jaws.

16. A pipe clamp as claimed in claim 15 in which the major axes of said projections are offset in a direction toward an outer end of the mouth of said jaws with respect to the major axes of the cooperating recesses.

17. A pipe clamp as claimed in claim 15 in which the major axes of said recesses are offset in a direction toward an outer end of the mouth of said jaws with respect to the major axes of said projections.

18. A pipe clamp as claimed in any one of claims 15, 16 or 17, in which said projections are on the one of said jaws positioned outwardly of the other of said jaws when the pipe clamp is encircling the pipe.

19. A pipe clamp as claimed in any one of claims 15, 16 or 17 in which said projections are on the one of said jaws positioned closest to said pipe when said pipe clamp encircles the same.

20. A pipe clamp for encircling a pipe, said pipe clamp comprising:
   a split flexible metal band means including at least one pair of circumferentially spaced bent back end portions arranged to be drawn towards each other;
   at least one pair of elongated lugs respectively attached to said at least one pair of end portions and having longitudinal axes extending parallel to the pipe when the clamp encircles the same;
   bolt means for moving said lugs toward one another to tighten said band means about said pipe; and
   means on each of said lugs for retaining the end portions of said band means, said retaining means on each elongated lug including a pair of ductile jaws extending longitudinally of the lug and cast in an open position with a mouth to receive the end portion of the band means, one of said jaws having a plurality of spaced projections extending longitudinally of the same and each of said projections having an elliptical cross-sectional configuration with a major axis extending parallel to the longitudinal axis of the lug, the other of said jaws having a plurality of spaced recesses extending longitudinally of the same and each of said recesses having an elliptical cross-sectional configuration with a major axis extending parallel to the longitudinal axis of the lug, said recesses cooperating with said projections to clamp the end portion of said band means therebetween when said jaws are closed, each of said projections having the major axis thereof radially offset with respect to the major axis of the cooperating recess of said recesses when said jaws are closed whereby cooperating projections and recesses are dimensioned to provide a space between the same when the jaws are closed, said space having a first portion of less thickness than the thickness of said band means whereby said band means is reduced in thickness when the jaws are closed and said space having a second portion of thickness at least as great as said band thickness to provide ease in closing said jaws.

21. A pipe clamp as claimed in claim 20 in which the major axes of said projections are offset in a direction toward an outer end of the mouth of said jaws with respect to the major axes of the cooperating recesses.

22. A pipe clamp as claimed in claim 20 in which the major axes of said recesses are offset in a direction toward an outer end of the mouth of said jaws with respect to the major axes of said projections.

23. A pipe clamp as claimed in any one of claims 20, 21 or 22 in which said projections are on the one of said jaws positioned outwardly of the other of said jaws when the pipe clamp is encircling the pipe.

24. A pipe clamp as claimed in any one of claims 20, 21 or 22 in which said projections are on the one of said jaws positioned closest to said pipe when said pipe clamp encircles the same.

* * * * *